US011891106B2

(12) United States Patent
Justinger

(10) Patent No.: US 11,891,106 B2
(45) Date of Patent: Feb. 6, 2024

(54) SYSTEM FOR HAND DETECTION ON A STEERING WHEEL

(71) Applicant: IEE INTERNATIONAL ELECTRONICS & ENGINEERING S.A., Echternach (LU)

(72) Inventor: Tobias Justinger, Hermeskeil (DE)

(73) Assignee: IEE INTERNATIONAL ELECTRONICS & ENGINEERING S.A., Echternach (LU)

( * ) Notice: Subject to any disclaimer, the term of this patent is extended or adjusted under 35 U.S.C. 154(b) by 534 days.

(21) Appl. No.: 17/260,921

(22) PCT Filed: Jul. 16, 2019

(86) PCT No.: PCT/EP2019/069136

§ 371 (c)(1), (2) Date: Jan. 15, 2021

(87) PCT Pub. No.: WO2020/016237

PCT Pub. Date: Jan. 23, 2020

(65) Prior Publication Data

US 2021/0331732 A1 Oct. 28, 2021

(30) Foreign Application Priority Data

Jul. 18, 2018 (LU) .................................. LU100880

(51) Int. Cl.

*B62D 1/04* (2006.01)
*G01D 5/24* (2006.01)
(Continued)

(52) U.S. Cl.

CPC ............... *B62D 1/046* (2013.01); *G01D 5/24* (2013.01); *G01S 7/4815* (2013.01); *G01S 7/4816* (2013.01); *G01S 17/06* (2013.01)

(58) Field of Classification Search

CPC .......... B60K 28/02; B62D 1/046; B62D 1/06; G01D 5/24; G01S 17/06; G01S 7/4815; G01S 7/4816

See application file for complete search history.

(56) References Cited

U.S. PATENT DOCUMENTS 4,706,072 A 11/1987 Ikeyama
10,181,200 B1 * 1/2019 Chao .................... G02B 5/1828
(Continued)

FOREIGN PATENT DOCUMENTS

CN 104106215 A 10/2014
CN 104854553 A 8/2015
(Continued)

OTHER PUBLICATIONS

Machine translation of FR 3028342, May 2016.*
(Continued)

*Primary Examiner* — Peter B Kim
(74) *Attorney, Agent, or Firm* — Reising Ethington P.C.

(57) ABSTRACT

A system for hand detection on a steering wheel. The system includes: at least one light source adapted to emit an emitted signal of light so that the emitted signal is directed from inside the steering wheel to at least one detection area of a surface of the steering wheel, the detection area being at least partially transparent for the emitted signal; at least one light sensor adapted to detect a reflected signal, which is a part of the emitted signal that is reflected from the detection area into the inside of the steering wheel; and a detection unit coupled to the at least one light sensor and adapted to detect a hand of a user on the steering wheel based on a detection of the reflected signal.

14 Claims, 3 Drawing Sheets

(51) Int. Cl.
*G01S 7/481* (2006.01)
*G01S 17/06* (2006.01)

(56) References Cited

U.S. PATENT DOCUMENTS

| | | | | |
|---|---|---|---|---|
| 2006/0044144 | A1 | 3/2006 | Duval | |
| 2011/0133919 | A1 | 6/2011 | Evarts et al. | |
| 2014/0081521 | A1 | 3/2014 | Fröjdh et al. | |
| 2015/0048845 | A1 | 2/2015 | Petereit et al. | |
| 2015/0123947 | A1* | 5/2015 | Jubner | G06F 3/04847 345/175 |
| 2015/0210273 | A1 | 7/2015 | Kaufmann et al. | |
| 2017/0297618 | A1 | 10/2017 | Shah et al. | |
| 2018/0099693 | A1 | 4/2018 | Trimboli et al. | |

FOREIGN PATENT DOCUMENTS

| | | | |
|---|---|---|---|
| CN | 107416009 | A | 12/2017 |
| DE | 102011109711 | A1 | 2/2013 |
| DE | 102017102265 | A1 | 8/2017 |
| DE | 102016005013 | A1 | 10/2017 |
| FR | 3028342 | A1 | 5/2016 |
| JP | 2011254957 | A | 12/2011 |
| KR | 20180042750 | A | 4/2018 |

OTHER PUBLICATIONS

International Search Report corresponding to International Application No. PCT/EP2019/069136, dated Sep. 20, 2019, 3 pages.
Written Opinion corresponding to International Application No. PCT/EP2019/069136, dated Sep. 20, 2019, 7 pages.
English translation of Chinese Examination Report corresponding to Chinese Application No. 201980046929.9; dated Sep. 6, 2022; 7 pages.
English translation of Chinese Examination Report corresponding to Chinese Application No. 201980046929.9; dated Mar. 10, 2023; 10 pages.

* cited by examiner 20.1
6
T1
7
T2
R1
R2
2
E1
E2
20
3
8
5
9
4
11
11
11
11

20.1
6
T1
T1
7
E1
R1
R1
20
5
2
8
3
9
11
11
11

20.1
6
T1
T2
7
R1
R2
2
E1
E2
20
5
3
8
4
11
11
11

SYSTEM FOR HAND DETECTION ON A STEERING WHEEL

TECHNICAL FIELD

The invention relates a system for hand detection on a steering wheel and to a method for hand detection on a steering wheel.

BACKGROUND

In modern vehicles, it can be necessary to detect whether the driver has his hands on the steering wheel (e.g. in order to determine whether the driver is ready to carry out a steering action). Steering assistants may include an active correction possibility for the driver to be used in certain circumstances. For example, a provision may be made for a steering assistance system to be activated only when the driver has his hands on the steering wheel. In most countries, it is mandatory that the vehicle when moving is under the control of the driver, even if modern assistance systems would be able to safely operate the vehicle in certain situations.

In order to identify whether or not at least one hand is positioned on the steering wheel, several concepts have been developed. One concept relies on the EPS system and induces a low-amplitude vibration in the steering wheel. If the hands of the driver are on the steering wheel, this has a dampening effect which can be detected. However, the vibration can be distracting or disturbing to the driver. Such systems and other hand detection systems that are based on the mechanical influence of a hand on the steering wheel are e.g. described in DE 10 2016 005 013 A1, DE 10 2017 102 265 A1, US 2015/0210273, A1 US 2017/0297618 A1 and US 2018/0099693 A1. Other systems use dedicated sensors. One such system uses resistive sensor elements where two conductors are disposed spaced apart under the surface of the steering wheel. If a certain pressure is exerted on the surface, the conductors are brought into contact. However, the amount of pressure required to activate the sensor makes this approach less reliable. Another approach uses capacitive sensors, which detect a hand by its influence on an electric field generated by the sensor. Such systems are e.g. described in DE 10 2011 109 711 A1 and US 2015/0048845 A1. While these sensors are more reliable, they considerably increase the complexity of the steering wheel. This is in particular true if the position of the hand is to be detected, which makes it necessary to provide a plurality of sensors, i.e. one for each surface position, along with detection circuitry for each individual sensor. This complexity increases the costs and makes the system more prone to failure. Capacitive sensors may also lead to false detections, e.g. due to varying electrical properties of the hand of the user or other object in the vicinity of the steering wheel that influence the electric field of the sensor.

SUMMARY

It is thus an object of the present invention to provide reliable means for hand detection on a steering wheel.

This problem may be solved by a system and method for hand detection on a steering wheel according to the claims.

The invention provides a system for hand detection on a steering wheel. “Hand detection on a steering wheel” in general refers to detecting whether at least one hand of a user is on a steering wheel. The steering wheel of course belongs to a vehicle, normally a land vehicle like a car. However, application to other vehicles like sea or air vehicles is also contemplated.

The system comprises at least one light source adapted to emit an emitted signal of light so that the emitted signal is directed from inside the steering wheel to at least one detection area of a surface of the steering wheel, the detection area being at least partially transparent for the emitted signal. Various types of light sources may be used without departing from the scope of the invention. For efficiency reasons, the light source preferably comprises at least one LED (light-emitting diode). The light source may also comprise some (possibly simple) optical element like a lens or a mirror disposed to direct or focus the emitted signal. The emitted signal is a light signal, which in general means that it comprises electromagnetic radiation having a wavelength between 100 nm and 50 μm, preferably between 315 nm and 1450 nm. It may comprise visible as well as invisible light. The light source is adapted to emit the emitted signal in such a way that the emitted signal impinges from inside the steering wheel onto at least one detection area, which is a portion of a surface of the steering wheel. One could also say that the detection area of the surface can be illuminated by the emitted signal from inside the steering wheel.

In particular, the detection area can be part of a surface of an outer rim or edge of the steering wheel. In general, this will be a surface that is designed for being touched by at least one hand of a user during normal operation of the steering wheel. The detection area is at least partially transparent for the emitted signal, which means that at least a part of the emitted signal can be transmitted through the detection area to the outside of the steering wheel, at least if the detection area is not covered by a non-transparent object. The detection area can be regarded as a “window” in the surface of the steering wheel. This window is normally formed by a solid (partially) transparent object, but it could also be realised by at least one recess or through-hole in the surface of the steering wheel. The latter option is normally not preferred, though, since it bears the risk of the recess becoming clogged by dirt or other foreign objects.

The system further comprises at least one light sensor that is adapted to detect a reflected signal, which is a part of the emitted signal that is reflected from the detection area into the inside of the steering wheel. In general, the emitted signal can be partially transmitted through the detection area and partially be reflected back into the inside of the steering wheel. Also, a part of the emitted signal can be absorbed. The reflected signal is a part of the emitted signal that is reflected. The intensity and possibly the spectrum of the reflected signal can depend on several factors. It is understood that if the detection area is part of a solid transparent element, there is always some internal reflection when a light signal reaches the interface between the transparent element and air that surrounds the steering wheel. However, if an object like a hand of a user (driver) is placed on the detection area, this influences the reflected signal. For example, light could be transmitted through the detection area into the air outside of the steering wheel, be reflected by the hand and re-enter the inside of the steering wheel through the detection area, thereby normally increasing the reflected signal. It should be noted that of course some of the light is absorbed by the hand. However, if the hand is directly placed on a transparent element in the detection area, so that there is no air in between, the reflection process is changed in that there is no optically less dense medium (air) outside the transparent element. This could reduce the amount of light that is reflected into the inside of the steering wheel. In general, the reflected signal is that part of the reflected light that can be detected by the light sensor. It is understood that the light sensor has to be sensitive for at least a part of the reflected signal, i.e. it has to be sensitive to the respective frequency or wavelength, respectively. The light sensor may e.g. comprise a photodiode. Optionally, several photodiodes may be combined for a one light sensor, with the photodiodes optionally being sensitive for different wavelengths. The light sensor may also comprise a filter in order to selectively detect a certain wavelength range, a certain polarisation or the like.

Normally, the at least one light source and the at least one light sensor are disposed inside the steering wheel. Although it is technically possible to dispose the light source or the light sensor outside the steering wheel, this makes it complicated to guide the emitted signal from the light source to the detection area or the reflected signal from the detection area to the light sensor.

Also, the system comprises a detection unit coupled to the at least one light sensor and adapted to detect a hand of a user on the steering wheel based on a detection of the reflected signal. The detection unit is normally coupled by wire to the at least one light sensor. Either way, it is coupled or connected so that it receives information about the detection of the reflected signal. Depending on the embodiment, the light sensor could actively send data to the detection unit (e.g. via a bus system) or the light sensor could work passively, i.e. the detection unit determines the detection of the reflected signal based on the properties of the light sensor. For instance, if the light sensor comprises a photodiode, the detection unit could apply a voltage to the photodiode and detect the current, which of course changes with the resistance of the photodiode, which in turn depends on the intensity of the reflected signal. As described before, the reflected signal from a specific detection area depends on whether an object is placed on the surface in this detection area or not. Therefore, if a hand is placed on the steering wheel so that it covers at least one detection area, this influences the reflected signal, which in turn can be used by the detection unit to detect the presence of the hand. For instance, the detection unit may compare a quantity related to the intensity of the reflected signal, like the resistance of the photodiode, with at least one threshold value. Depending on the comparison, the detection unit determines whether a hand is placed on the surface of the steering wheel or not. It is understood that the detection unit may at least partially be software-implemented.

It is preferred that the detection unit is disposed inside the steering wheel. Thus, the connections to the at least one light sensor can be kept relatively short and are generally more robust, e.g. for electromagnetic compatibility. The power distribution to the individual light sources and the signal runtime from the light sensors are also better with short connections.

The light source and the detection area can be dedicated components of the system for hand detection. However, the illumination of the detection area may additionally be used for other purposes, e.g. to highlight a certain part of the steering wheel or to visualise ADAS (Advanced Driver Assistance Systems information.

While it is conceivable that the emitted signal travels through air from the light source to the detection area, it is highly preferred that the system comprises at least one light guide which is configured to guide an emitted signal from at least one light source to at least one detection area. "Guiding" the emitted signal in this context may optionally, but not necessarily, include redirecting and/or focusing or defocusing the emitted signal. In the simplest case, the emitted signal may freely propagate within the light guide. The light guide can be made of any material that is at least partially transparent for the emitted signal, e.g. glass or transparent polymer. At least some surfaces of the light guide may comprise a reflective lining, although this may be unnecessary due to the changing refractive index between the inside of the light guide and the outside medium. The light guide may be a singular, one-piece element or it may comprise several elements. For instance, it could comprise a plurality of optical fibers. Preferably, but not necessarily, at least one light guide extends from the light source to the detection area. This normally reduces the risk of signal losses between the light source and the detection area, which could be e.g. due to unwanted absorption, scattering or reflection. In particular, the surface of the steering wheel in the detection area may be a surface of the light guide.

Also, it is preferred that at least one light guide is configured to guide the reflected signal to at least one light sensor. In particular, this may be the same light guide that is configured to guide the emitted signal to the detection area. However, two distinct light guides could also be employed. Again, it is preferred—but not necessary—that the light guide extends from the detection area to the light sensor. Again, guiding the reflected signal may include redirecting, focusing or defocusing the reflected signal. In general, the same materials may be used for the light guide that guides the emitted signal and the light guide that guides the reflected signal. Even if these two light guides are not identical, the same design options (one or several pieces etc.) can be used for both light guides.

Preferably, the system comprises a plurality of light sources, a plurality of detection areas and/or a plurality of light sensors. There are various options in this context. For example, the system could comprise a plurality of detection assemblies, where each detection assembly comprises one light source, one detection area and one light sensor, without any communication or interference between the different detection assemblies. Alternatively, a single light source could be configured to send the emitted signal to a plurality of detection areas, while one light sensor corresponds to each detection area. Further, a plurality of light sources could send emitted signals to a plurality of detection areas, while a single light sensor is configured to receive the reflected signal from several detection areas. However, the associations between the light sources and the light sensors may be more complex, e.g. a plurality of light sources may send emitted signals so that the reflected signal resulting from each emitted signal is received by a plurality of light sensors. Thus, the signal received by the individual light sensor can be regarded as a superposition of reflected signals resulting from a plurality of emitted signals. It is understood that there may be a dedicated light guide for each light source and/or each light sensor. Alternatively, at least one light guide may be associated with a plurality of light sources and/or a plurality of light sensors. If a plurality of light sources is employed, it may be advantageous if these light sources are not operated simultaneously but sequentially so that any reflected light can be unambiguously attributed to an emitted signal of one of the light sources.

Also, at least one light guide may be configured to guide an emitted signal from a single light source to a plurality of detection areas. For example, the light guide could be disposed along the periphery of the steering wheel, extending along the circumferential direction with a plurality of detection areas disposed at regular or non-regular intervals where light can be coupled out of the light guide or into the light guide. The light source could be disposed at one end of the light guide, while one light sensor is disposed at the opposite end. Alternatively or additionally, one or several light sensors could be disposed in between the two ends, e.g. one light sensor being disposed in the proximity of each detection area. The light source could also be disposed somewhere between the two ends, with detection areas and light sensors being disposed on both sides of the light source.

As already hinted above, at least one light guide can be configured to guide reflected signals from a plurality of detection areas to at least one light sensor. Optionally, this may be a light guide that is configured to guide the emitted signal from a single light source to the plurality of detection areas. It is conceivable that the reflected signals from several detection areas are guided to a single light sensor or to a plurality of light sensors. The latter case, each light sensor may be configured to receive only the reflected signal from a single detection area or reflected signals from a plurality of detection areas.

In some cases, one light sensor could be intended to detect a reflected signal from a detection area that is associated with an emitted signal from a specific light source, but this light sensor could also receive light from other sources. This could in particular be ambient light but also scattered or reflected light from light sources that this light sensor is not associated with. Thus, there is a risk that such light from other sources is mistaken as a reflected signal. Several measures may be taken to prevent such false detections. According to one embodiment, the emitted signal is a polarized signal and at least one light sensor is adapted to selectively detect a polarized reflected signal. Since ambient light is normally not polarized, it could safely be distinguished from the reflected signal. Of course, it has to be assured that the polarization is not changed within the light guide or by the reflection in the detection area. Also, emitted signals from different light sources could be distinguished by using a different polarization for each signal.

Alternatively or additionally, in the emitted signal could be a modulated signal. In this context, all kinds of modulation could be used, e.g. a frequency, pulse, phase or amplitude modulation. For the respective light source this could also correspond to a color change, i.e. a modulation of the light wavelength. Again, ambient light normally has no modulation or even if it has a modulation, this modulation will be different from the modulation of the emitted signal. Again, different modulations could be used for the emitted signals from different light sources. The emitted signal could also be a pulse signal having a characteristic frequency, pulse length and/or pulse interval. Of course, a pulse signal can also be regarded as an amplitude-modulated signal where the amplitude is temporarily reduced to zero. If the emitted signal is a modulated signal, it may also be useful to detect not only an amplitude, but also a phase of the reflected signal.

Preferably, the detection unit is configured to control the at least one light source to emit the emitted signal. This can be particularly advantageous in that the detection unit can correlate the detection of a reflected signal with the emission of an emitted signal. For instance, the detection unit could activate a specific light source for a given time interval and/or with a given modulation pattern, whereby it is easier to associate the respective emitted signal with a detected reflected signal. For example, the modulation of the reflected signal should at least be similar to the modulation of the emitted signal and the reflected signal can only be received at times that correspond to the activation time of the respective light source (taking into account the time of flight of the light between the light source and the light sensor). If the emitted signal is a modulated signal, its modulation and/or the demodulation of the received signal is normally controlled by the detection unit.

Various wavelengths may be employed for the emitted signal. In general, the emitted signal can be a visible light signal, an ultraviolet light signal and/or an infrared light signal. This includes an emitted signal that comprises light from at least two of the above-mentioned spectra. In order to avoid interference between emitted signals from different light sources, different spectral ranges can be employed for the individual emitted signals. However, in some embodiments, interference may even be purposefully used for hand detection.

Although for some applications it may be enough to simply detect the presence of the hand on the steering wheel, it is normally preferred that the detection unit is configured to determine a position of the hand based on the detection of the reflected signal. In other words, the detection unit cannot only detect whether a hand is on the steering wheel but also in which part of the steering wheel. For such an embodiment, the system normally comprises a plurality of detection areas and the detection of the at least one reflected signal depends on which detection area is covered by the hand. Preferably, but not necessarily, this embodiment may employ a plurality of light sources, a plurality of light guides and/or a plurality of light sensors.

Optionally, the detection unit may be configured to determine an intensity of contact between the hand and the steering wheel. This may be achieved in different ways. For example, when the driver grips the steering wheel more firmly, this may mean that more detection areas are covered by the hand, which may lead to a detection by an increased number of light sensors. Also, when the intensity of the contact increases, this could also have an influence on the reflection in a single detection area. For example, if the surface of the steering wheel in the respective detection area is a surface of a light guide, the reflection characteristics for each point of the detection area depend on whether the hand is in direct contact with the light guide or whether there is an air-filled gap in between. Therefore, the reflected signal will be different depending on whether the hand is loosely placed over the surface of the light guide or whether it is tightly pressed onto the surface of the light guide. Also, it is conceivable that the light guide is mechanically deformed when the hand firmly grips the steering wheel, which could also influence how the light is guided from the light source to the detection area and/or from the detection area to the light sensor.

It is also preferred that the detection unit is configured to detect two hands on the steering wheel based on a detection by a plurality of light sensors. In this embodiment, the detection unit may use a simultaneous detection by at least two light sensors that are adapted to receive reflected signals from at least two different, spaced-apart detection areas. The number of "active" detection areas and/or the amplitude of a detected signal may be used to distinguish a single hand from two hands. However, there are other possibilities and this embodiment is not limited to a detection method or algorithm. As another example, if the distance between two "active" detection areas is large enough, e.g. larger than the width of a normal hand, it can be assumed that the detection is not caused by a single hand, but by two hands.

While the detection of a hand based on the reflected signal can in general be considered reliable, false detections could occur under certain circumstances. In order to account for these cases, the system can comprise at least one capacitive sensor disposed along the surface of the steering wheel and the detection unit is configured to detect the hand at least partially based on a measurement by the at least one capacitive sensor. In other words, the optical detection by the inventive system is combined with a capacitive detection in order to increase the reliability. Thus, the detection system becomes redundant, e.g. in order to achieve a higher ASIL (Automotive Safety Integrity Level). This is particularly advantageous since the two detection methods rely on different measurement principles and are therefore not susceptible to the same sources of disturbance and/or misuse. For example, ambient light, which could potentially affect the optical detection, has no impact on a capacitance measurement. Similarly, the presence of another object except from the hand near the steering wheel or the impedance of the hand could affect the capacitance measurement but normally do not affect the optical detection. Apart from increasing the reliability of a detection, this embodiment could also be used to detect failure of one sensor system. For example, if the detection results by the optical system and the capacitive system continue to differ from each other, this could indicate a failure of one of the systems. Apart from this, the internal measurement data can provide a lot of additional information, e.g. offset values, which are relevant for diagnostics.

Embodiments of the invention further provide a method for hand detection on a steering wheel, with at least one light source, at least one light sensor and a detection unit coupled to the at least one light sensor. The method comprises:

- at least one light source emitting an emitted signal of light so that the emitted signal is directed from inside the steering wheel to a detection area, which is a portion of a surface of the steering wheel;
- at least one light sensor detecting a reflected signal, which is a portion of the emitted signal that is reflected from the detection area into the inside of the steering wheel; and
- the detection unit (9) detecting a hand of a user on the steering wheel based on a detection of the reflected signal.

All these terms have been described above with respect to the inventive system and will therefore not be explained again.

Preferred embodiments of the inventive method correspond to those of the inventive system.

BRIEF DESCRIPTION OF THE DRAWINGS

Further details and advantages of the present invention will be apparent from the following detailed description of not limiting embodiments with reference to the attached drawing, wherein.

DESCRIPTION OF PREFERRED EMBODIMENTS

Figure 1:
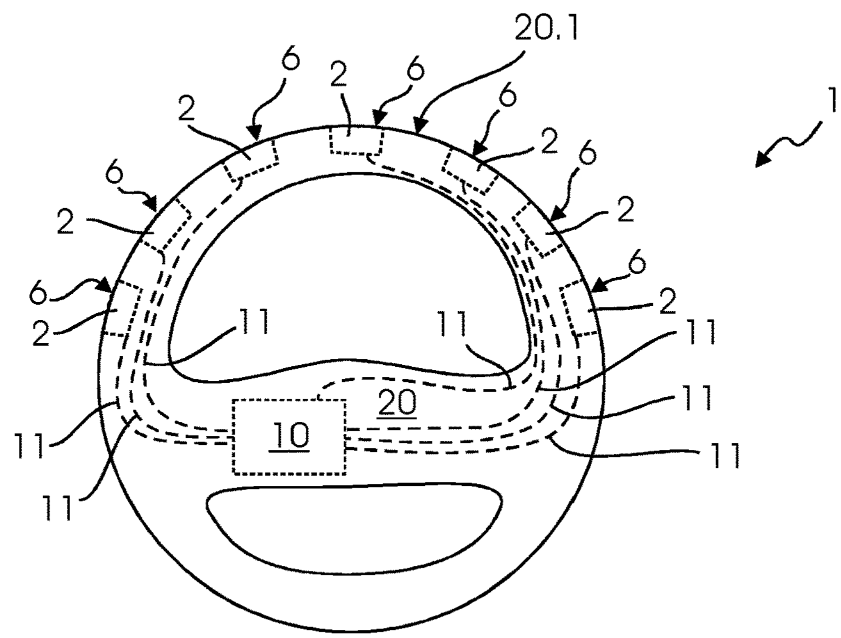
FIG. 1 is a schematic view of a steering wheel with a first embodiment of an inventive system for hand detection on a steering wheel.

FIG. 1 schematically shows a steering wheel 20 for a vehicle, normally a road vehicle. A circumferential surface 20.1 of the steering wheel comprises a plurality of detection areas 6. Underneath each detection area 6, a detection assembly 2 is disposed inside the steering wheel 20. Each detection assembly 2 is connected by conductors 11 to a detection unit 10. Alternatively, the detection assemblies 2 could be connected with each other and with the detection unit 10 by a common bus structure. The detection unit 10 is disposed inside the steering wheel 20 but could optionally also be disposed in another part of the vehicle.

Figure 2:
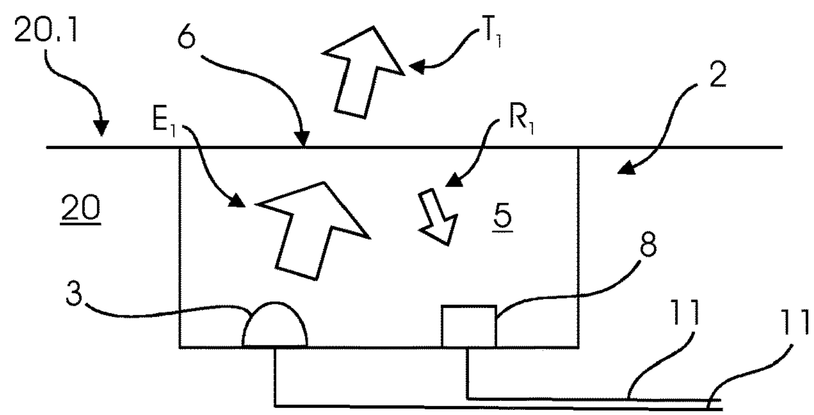
FIG. 2 is a schematic view of a first embodiment of a detection assembly for an inventive system.

FIG. 2 shows a first embodiment of a detection assembly 2. It comprises an LED 3 serving as a light source as well as a photodiode 8 serving as a light sensor. Both the LED 3 and the photodiode 8 are disposed inside a light guide 5 that extends up to the detection area 6. One could also say that the detection area 6 is part of a surface of the light guide 5. Both the LED 3 and the photodiode 8 are connected to the detection unit 10. During operation, the detection unit 10 controls the LED 3 to emit an emitted signal $E_1$, which travels through the light guide 5 to the detection area 6. The emitted signal $E_1$ may be a visible light signal, and ultraviolet signal or an infrared signal. It is also possible to combine different wavelengths, e.g. by replacing the single LED 3 with several LEDs or with a multicolor LED. It should be noted that the geometry of the light guide 5 is simplified here and in the following figures. In general, its geometry can be adapted to direct, focus and/or unfocus the light signals in any desired way.

The light guide 5 and therefore the detection area 6 are partially transparent for the emitted signal $E_1$. If no object is placed on the detection area 6, most of the emitted signal $E_1$ is transmitted as a transmitted signal $T_1$ through the surface of the light guide 5 to the outside of the steering wheel 20, while a minor part is internally reflected. Some of the latter is received as a reflected signal $R_1$ by the photodiode 8, thereby changing the resistance of the photodiode 8. The detection unit 10 applies a voltage to the photodiode 8 and detects the current, whereby any changes in the resistance of the photodiode 8 can be detected. As an alternative to the "passive" detection using photodiodes 8, there are many other possibilities how the light could be detected, e.g. by a phototransistor or a digital device connected to the detection unit 10 via a serial bus.

Figure 2A:
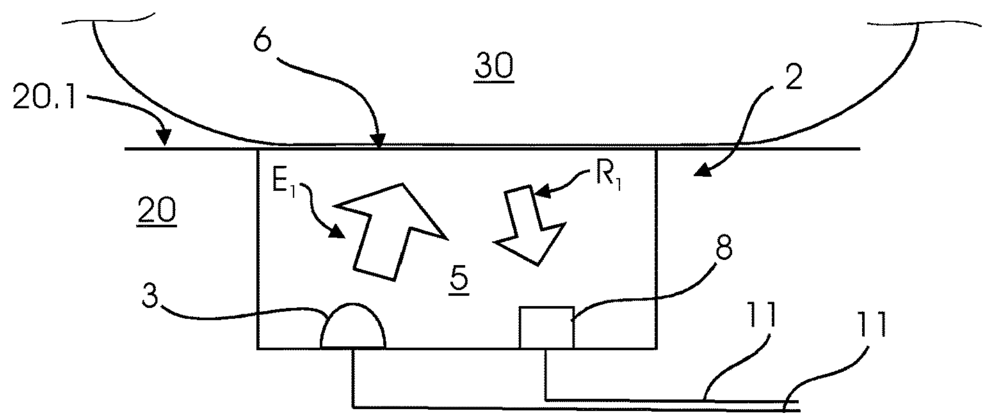
FIG. 2A is a schematic view corresponding to FIG. 2 with a hand on the detection assembly.

If a hand 30 is placed on the detection area 6, as shown in FIG. 2A, this has an impact on the reflected signal $R_1$, which can be used by the detection unit 10 to detect the presence of the hand 30. How the reflected signal $R_1$ is affected, could potentially depend on several factors, e.g. on the wavelength of the emitted signal, the skin color of the hand 30, whether the person is wearing gloves etc. Optionally, it is possible to perform a calibration or learning procedure in which the detection unit 10 learns how the reflected signal $R_1$ is affected. Any calibration can be performed during production, but optionally also while the system 1 is in operation. Normally, the reflected signal $R_1$ becomes more intense if the hand 30 is disposed on the detection area 6, because a major part of the light that would otherwise exit the steering wheel 20 to the outside is reflected back into the waveguide 5, while of course some part is also absorbed by the hand 30.

Depending on the number, distance and position of the individual detection areas 6, the detection unit 10 can more or less accurately determine the position of the hand 30 and also determine whether the driver has a single hand 30 or two hands 30 placed on the steering wheel 20 (including the positions of the two hands 30).

Optionally, the detection unit 10 may determine an intensity of contact between the hand 30 and the steering wheel 20. This may be achieved in different ways. For example, when the driver grips the steering wheel 20 more firmly, this may mean that more detection areas 6 are covered by the hand 30, which may lead to a detection by an increased number of photodiodes 8. Also, when the intensity of the contact increases, this could also have an influence on the reflection in a single detection area 6, for example because there is hardly any air-filled gap between the light guide 5 and the hand 30. Also, the light guide 5 could be mechanically deformed when the hand 30 firmly grips the steering wheel 20, which could also influence how the light is guided from the LED 3 to the detection area 6 and/or from the detection area 6 to the photodiode 8.

In order to better distinguish the reflected signal $R_1$ from external light, a polarization filter could be used with the LED 3 and with the photodiode 8. Also, the emitted signal $E_1$ could be modulated in a specific way or it could be a pulse signal. By correlating the emitted signal $R_1$ with the received signal $R_1$, the detection unit 10 can then eliminate any influences due to external light sources.

Figure 3:
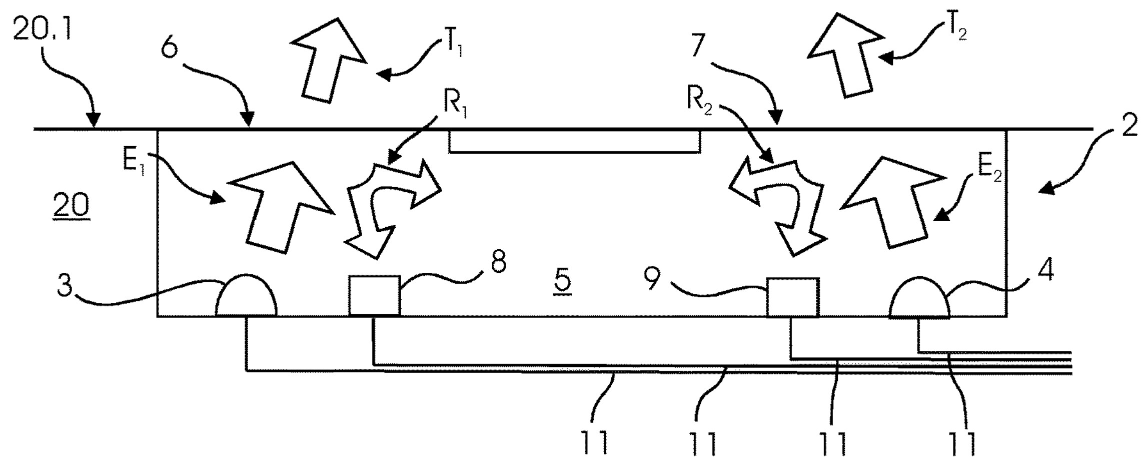
FIG. 3 is a schematic view of a second embodiment of a detection assembly for an inventive system.

FIG. 3 shows an alternative embodiment of a detection assembly 2 that can be used in an inventive system 1. This embodiment, a single light guide 5 is disposed over two LEDs 3, 4 and two photodiodes 8, 9. The light guide 5 extends to a first detection area 6 as well as to a second detection area 7. A first LED 3 and a first photodiode 8 are disposed under the first detection area 6, while a second LED for and a second photodiode 9 are disposed under the second detection area 7. In principle, this embodiment works similarly to the first embodiment shown in FIG. 2. Each of the LEDs 3, 4 emit an emitted signal $E_1$, $E_2$ into a detection area 6, 7 where a transmitted signal $T_1$, $T_2$ exits the steering wheel 20, while a reflected signal $R_1$, $R_2$ can be received by a photodiode 8, 9. However, it is possible that the first LED 3 sends an emitted signal $E_1$ not only to the first detection area 6 but also to the second detection area 7, while the second LED 4 also sends an emitted signal $E_1$ to the first detection area 6 as well as to the second detection area 7. Likewise, it is possible that the first photodiode 8 receives a reflected signal $R_2$ from the second detection area 7 while the second photodiode 9 receives a reflected signal $R_1$ from the first detection area 6. If so, it is normally desirable to be able to distinguish which part of the reflected signal $R_1$, $R_2$ originates from which LED 3, 4. This can be achieved in different ways. For example, the detection unit 10 could operate the first and second LED 3, 4 sequentially, i.e. alternatingly, so that only one LED 3, 4 generates an emitted signal $E_1$, $E_2$ at a time. Alternatively, the two LEDs 3, 4 could be operating at different wavelengths, and the photodiodes 8, 9 could be configured to selectively receive one of the wavelengths, optionally by using a filter. Also, different polarizations could be used for the emitted signals $E_1$, $E_2$ from the first and 2nd LED. Finally, the waveform of the emitted signal $E_1$, $E_2$ could be used to distinguish the two emitted signals $E_1$, $E_2$. For example, these signals $E_1$, $E_2$ could be modulated in different ways or they could be pulse signals with different characteristics. It is understood that some of these measures also help to distinguish between light originating from an LED 3, 4 and ambient light.

Figure 4:
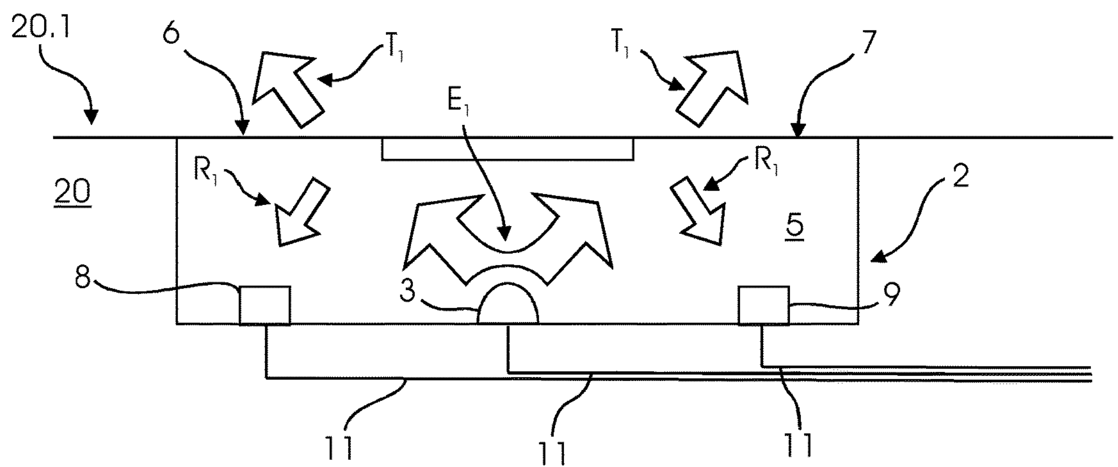
FIG. 4 is a schematic view of a third embodiment of a detection assembly for an inventive system.

FIG. 4 shows a third embodiment of a detection assembly 2 that is somewhat similar to the second embodiment, but only comprises a single LED 3 disposed halfway between a first and second photodiode 8, 9. During operation, the first and second photodiode 8, 9 both receive reflected signals $R_1$ that originate from an emitted signal $E_1$ by the LED 3. Depending on the geometry of the light guide 5 and the positions of the LED 3 and the photodiodes 8, 9 with respect to the first and second detection area 6, 7, it can be assumed that the first photodiode 8 mostly receives a reflected signal $R_1$ from the first detection area 6 while the second photodiode 9 receives a reflected signal mostly from the second detection area 7. Thus, it is possible to determine whether a hand 30 is placed on the first detection area 6, the second detection area 7 or on both detection areas 6, 7.

Figure 5:
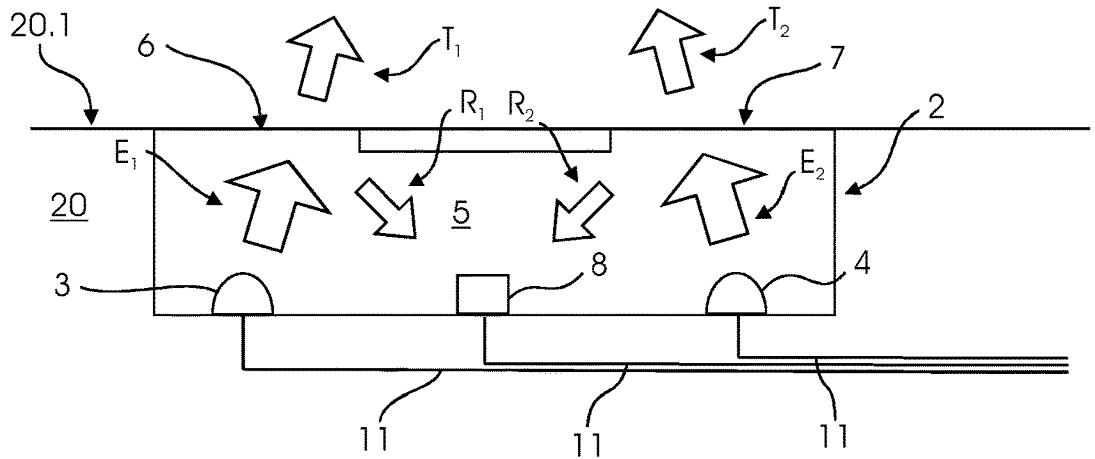
FIG. 5 is a schematic view of a fourth embodiment of a detection assembly for an inventive system.

FIG. 5 shows a fourth embodiment of a detection assembly 2 that has a similar setup as the third embodiment. However, a first LED 3 is disposed underneath the first detection area 6, while a second LED 4 is disposed underneath the second detection area 7 and a single photodiode 8 is disposed between the LEDs 3, 4. In response to an emitted signal $E_1$, $E_2$ from either of the LEDs 3, 4, the photodiode 8 can receive a reflected signal $R_1$, $R_2$ that originates mostly from the detection area 6, 7 under which the respective LED 3, 4 is disposed. In order to determine the origin of the reflected signal $R_1$, $R_2$ (or rather the corresponding emitted signal $E_1$, $E_2$), each LED 3, 4 may emit an emitted signal $E_1$, $E_2$ of a specific modulation or a specific pulse signal. Alternatively, the detection unit 10 could operate the first LED 3 and the second LED 4 alternatingly.

Figure 6:
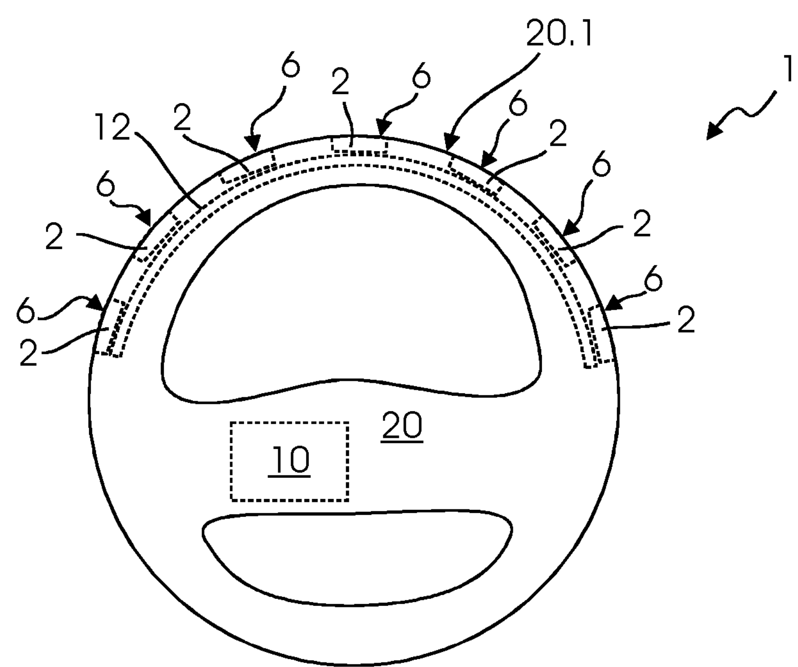
FIG. 6 is a schematic view of a steering wheel with a second embodiment of an inventive system.

FIG. 6 shows a steering wheel 20 with a slightly modified second embodiment of an inventive system 1 for hand detection. For sake of simplicity, the electrical conductors 11 are not shown in this figure. In addition to the detection assemblies 2, a capacitive sensor 12 is disposed along the surface 20.1 of the steering wheel 20. This capacitive sensor 12 is also connected to the detection unit 10 and serves as a redundant means for detecting the presence—and the position—of a hand 30 on the steering wheel 20. The type of capacitive sensor 12 is not limited in this context and any type known in the art can be used. It is understood that the capacitive sensor 12 could also be connected to some other control device that is separate from the detection unit 10. Either way, a detection by a photodiode 8, 9 and a detection by the capacitive sensor 12 can be used to verify each other if they coincide. This is particularly advantageous in that the two sensor types are not susceptible to the same sources of disturbance. If a hand 30 is detected only by one sensor type, various criteria can be applied how to interpret this result. Among others, repeated detection by only one sensor type can be considered as an indication of a failure of the other sensor type.

The invention claimed is:

1. A system for hand detection on a steering wheel, comprising:

at least one light source adapted to emit an emitted signal of light so that the emitted signal is directed from inside the steering wheel to at least one detection area of a surface of the steering wheel, the detection area being at least partially transparent for the emitted signal;

at least one light sensor adapted to detect a reflected signal, which is a part of the emitted signal that is reflected from the detection area into the inside of the steering wheel; and a detection unit coupled to the at least one light sensor and adapted to detect a hand of a user on the steering wheel based on a detection of the reflected signal, wherein the at least one light source comprises a first light source and a second light source, and the detection unit is configured to control the first light source and the second light source to emit the emitted signal alternatingly, so that only one of the first light source and the second light source emits the emitted signal at a time.

2. A system according to claim 1, wherein the system comprises at least one light guide which is configured to guide an emitted signal from at least one light source to at least one detection area.

3. A system according to claim 2, wherein at least one light guide is configured to guide an emitted signal from a single light source to a plurality of detection areas.

4. A system according to claim 2, wherein at least one light guide is configured to guide reflected signals from a plurality of detection areas to at least one light sensor.

5. A system according to claim 1, wherein at least one light guide is configured to guide the reflected signal to at least one light sensor.

6. A system according to claim 1, wherein the system comprises a plurality of light sources, a plurality of detection areas, and/or a plurality of light sensors.

7. A system according to claim 1, wherein the emitted signal is a polarised signal and at least one light sensor is adapted to selectively detect a polarised reflected signal.

8. A system according to claim 1, wherein the emitted signal is a modulated signal.

9. A system according to claim 1, wherein the detection unit is configured to determine a position of the hand based on the detection of the reflected signal.

10. A system according to claim 1, wherein the emitted signal is a visible light signal, an ultraviolet light signal and/or an infrared light signal.

11. A system according to claim 1, wherein the detection unit is configured to determine an intensity of contact between the hand and the steering wheel.

12. A system according to claim 1, wherein the detection unit is configured to detect two hands on the steering wheel based on a detection by a plurality of light sensors.

13. A system according to claim 1, wherein the system comprises at least one capacitive sensor disposed along the surface of the steering wheel and the detection unit is configured to detect the hand at least partially based on a measurement by the at least one capacitive sensor.

14. A method for hand detection on a steering wheel, with at least one light source, at least one light sensor and a detection unit coupled to the at least one light sensor, the method comprising:

at least one light source emitting an emitted signal of light so that the emitted signal is directed from inside the steering wheel to a detection area, which is a portion of a surface of the steering wheel;

at least one light sensor detecting a reflected signal, which is a portion of the emitted signal that is reflected from the detection area into the inside of the steering wheel; and the detection unit detecting a hand of a user on the steering wheel based on a detection of the reflected signal, wherein the at least one light source comprises a first light source and a second light source, and the detection unit is configured to control the first light source and the second light source to emit the emitted signal alternatingly, so that only one of the first light source and the second light source emits the emitted signal at a time.

* * * * *